(12) United States Patent
Vogt et al.

(10) Patent No.: US 12,377,910 B2
(45) Date of Patent: Aug. 5, 2025

(54) METHOD FOR OPERATING A STEER-BY-WIRE STEERING SYSTEM OF A MOTOR VEHICLE, CONTROL DEVICE, COMPUTER PROGRAM, AND STEER-BY-WIRE STEERING SYSTEM

(71) Applicant: ZF Friedrichshafen AG, Friedrichshafen (DE)

(72) Inventors: Dominik Vogt, Meckenbeuren (DE); Ingo Dasch, Gräfelfing (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 241 days.

(21) Appl. No.: 18/040,205

(22) PCT Filed: Jun. 23, 2021

(86) PCT No.: PCT/EP2021/067163
§ 371 (c)(1),
(2) Date: Feb. 1, 2023

(87) PCT Pub. No.: WO2022/028772
PCT Pub. Date: Feb. 10, 2022

(65) Prior Publication Data
US 2023/0264739 A1 Aug. 24, 2023

(30) Foreign Application Priority Data

Aug. 6, 2020 (DE) ...................... 10 2020 209 961.8

(51) Int. Cl.
B62D 7/15 (2006.01)
(52) U.S. Cl.
CPC .................................. *B62D 7/159* (2013.01)

(58) Field of Classification Search
CPC ...................................................... B62D 7/159
See application file for complete search history.

(56) References Cited

U.S. PATENT DOCUMENTS

| 8,406,956 B2 | 3/2013 | Wey et al. |
| 11,059,515 B2 | 7/2021 | Obermüller et al. |

(Continued)

FOREIGN PATENT DOCUMENTS

| DE | 10 2009 000 868 A1 | 8/2010 |
| DE | 10 2017 219 881 A1 | 5/2019 |

(Continued)

OTHER PUBLICATIONS

German Patent Office, Office Action Corresponding to 10 2020 209 961.8 (mailed Mar. 18, 2021).

(Continued)

*Primary Examiner* — Dale W Hilgendorf
*Assistant Examiner* — Hana Lee
(74) *Attorney, Agent, or Firm* — Finch & Maloney PLLC

(57) ABSTRACT

A method is disclosed for a steer-by-wire steering system of a motor vehicle, the system having at least one steering function that requests one or more steering angle changes as target steering angles for at least at one vehicle axle. An arbitration unit (AE) weights the steering angle changes as target steering angles (SLw_i) and, taking into account at least one target steering angle (SLw_i), determines an overall target steering angle (G_SLw). Before the overall target steering angle (G_SLw) is set by an actuator of the steer-by-wire steering system, a check is carried out to see whether a gradient of the overall target steering angle (G_SLw) is smaller than or equal to the gradient of the at least one target steering angle (SLw_i).

17 Claims, 3 Drawing Sheets

(56) References Cited

U.S. PATENT DOCUMENTS

| | | | |
|---|---|---|---|
| 11,485,405 B2 | 11/2022 | Vizer | |
| 2005/0125135 A1* | 6/2005 | Fujioka | B62D 6/04 |
| | | | 701/70 |
| 2010/0211264 A1* | 8/2010 | Wey | B62D 6/00 |
| | | | 701/41 |
| 2019/0135337 A1* | 5/2019 | Obermüller | B60W 30/045 |
| 2021/0024123 A1* | 1/2021 | Vizer | B62D 5/006 |

FOREIGN PATENT DOCUMENTS

| | | |
|---|---|---|
| DE | 10 2018 109 084 A1 | 10/2019 |
| JP | 2006218880 A * | 8/2006 |
| WO | 2019/229205 A1 | 12/2019 |

OTHER PUBLICATIONS

European Patent Office, International Search Report Corresponding to PCT/EP2021/067163 (mailed Oct. 11, 2021).
European Patent Office, Written Opinion Corresponding to PCT/EP2021/067163 (mailed Oct. 11, 2021).

* cited by examiner

METHOD FOR OPERATING A STEER-BY-WIRE STEERING SYSTEM OF A MOTOR VEHICLE, CONTROL DEVICE, COMPUTER PROGRAM, AND STEER-BY-WIRE STEERING SYSTEM

RELATED APPLICATIONS

This application claims the benefit under 35 U.S.C. § 371 as a U.S. National Phase Application of application no. PCT/EP2021/067163, filed on 23 Jun. 2021, which claims benefit of German Patent Application no. 10 2020 209 961.8, filed 6 Aug. 2020, the contents of which are hereby incorporated herein by reference in their entireties

FIELD OF THE DISCLOSURE

The invention relates to a method for operating a steer-by-wire steering system, a control unit, a computer program with program code means, and a steer-by-wire steering system.

BACKGROUND

A steer-by-wire steering system is used in a motor vehicle for steering the wheels on one or more axles. The essential feature is that with a steer-by-wire steering system the steering input by the driver and the actual steering movement are mechanically decoupled from one another. For example, the steering movement at the steering wheel by the driver is detected by a sensor system and relayed to a control unit which evaluates the data. Then, as a function of parameters of the vehicle and if necessary further prevailing environment conditions, control signals are sent to an actuator of the steer-by-wire steering system, which ultimately implements the steering movement of the wheels or, in other words, changes the wheel steering angle.

To ensure safe operation or, in other words, operation that is free from risk to the life and wellbeing of the occupants of the vehicle and its surroundings, functions are required which satisfy certain safety prescriptions or safety standards. For this, in the automotive industry requirements are laid down which are graded in a number of steps. For that purpose, so-termed Automotive Safety Integrity Levels (ASIL) have been defined, such that the Level (=step) is orientated on the basis of a hazard analysis and risk assessment. For this, potential hazards of a system are analyzed and the possible fault functions in specific driving situations are classified in accordance with the estimated hazard or requirement into various safety requirement steps from A to D. In this, level or step A is regarded as the lowest level and level D is regarded as the highest level (ASIL-A to ASIL-D). The chassis of a vehicle must satisfy strict or very strict requirements. The wheels of a motor vehicle are suspended on its chassis. The steering system associated with the chassis is designed to be wheel-guiding. When driving straight ahead or also when driving round a curve the wheels have to be guided in accordance with their respective wheel steering angles so that their wheel steering angle does not change due to lateral forces that act upon the wheels, or only change within small tolerated limits—otherwise driving round a curve or keeping to the curve radius would not be possible. This is difficult in particular because, to put it simply, the wheels constantly try to change their wheel steering angle. This becomes noticeable, for example, when the steering wheel is released while driving around a curve. Owing to the design-related toe-in or tracking in the chassis the wheels then try to return to a neutral position in the direction of driving straight ahead. When driving straight ahead the wheel steering angle equals zero degrees. If now the wheels on at least one axle are steered by a steer-by-wire steering system, the said steer-by-wire steering system must be of wheel-guiding design. Depending on the driving situation the steer-by-wire steering system must be capable of carrying out a slow and smooth, or else a rapid steering movement even under the influence of the greatest lateral forces. For example, during overland driving at a high speed, such as 100 km/h, very small steering movements or wheel steering angle changes suffice to maintain the direction of the vehicle. On the other hand, during a parking process large steering angle changes are needed, and owing to the large wheel contact forces and to small wheel rotation movements, high actuating forces are required. An erroneous steering movement of the steer-by-wire steering system can hardly be controlled by an ordinary driver, above all at high vehicle speeds. Accordingly, for steering systems and thus also steer-by-wire steering systems the strictest safety level according to ASIL-D is specified.

Usually, with steer-by-wire steering systems the actuation signal and the associated steering angle change is calculated by a control unit of the steer-by-wire steering system. In absolute terms an overall target steering angle is calculated. On the basis for example of the steering angle and the speed of the vehicle, the calculated actuation signal is passed on to the actuator of the steer-by-wire steering system which then implements the steering movement. During this, the steer-by-wire steering system itself checks that a maximum steering angle is not being exceeded, so that the steering angle is limited, and for example, there can be no collision with chassis components or parts of the vehicle body. Such a function can be realized in the form of a so-termed corridor function. If the steer-by-wire steering system is to be combined with further steering functions, for example deriving from driver-assistance systems, then it must be ensured that steering angle changes generated from outside the steer-by-wire steering system or its control unit are if necessary ignored by the corridor function. To satisfy ASIL-D, it must be excluded under any circumstances that the steer-by-wire steering system receives an erroneous signal to change the steering angle.

SUMMARY

It is an objective of the present invention to enable the necessary safe operation of steer-by-wire steering systems in vehicles with a variety of steering functionalities.

This objective is achieved by a method as disclosed herein, in combination with its characterizing features. The detailed description provides advantageous further developments of the invention. Besides the method according to the present disclosure, to achieve the objective a control unit and a computer program with program code means and a steer-by-wire steering system are also disclosed.

According to a first aspect of the invention, a method for operating a steer-by-wire steering system of a motor vehicle is indicated. In a vehicle, one or more steering angle changes of at least one wheel on at least one vehicle axle are called for by at least one steering function. An arbitration unit receives a steering angle change request along the signal path, for example by way of a bus, such as a CAN-bus, FlexRay bus, or the like. In a first step the arbitration unit assigns a weighting to the requested steering angle changes presented as target steering angles by the steering function concerned. These target steering angles are prioritized by the weighting. For example, when an assistance function has been activated by the driver for parking, i.e. for parking the vehicle in an existing space, a target steering angle is called for or specified. At low speed, such as less than 25 km/h, a corridor function that represents a further steering function allows the wheels on the front and rear axles to be steered in opposite directions. However, the maximum steering angle is limited so that, for example, the wheel does not make contact with the chassis or the wheel arch. That function produces a first target angle. By virtue of the activated assistance function for parking it can be assumed that to park the vehicle large steering angles will be required, which should be set by the actuator of the steer-by-wire steering system. A further target steering angle is specified. The arbitration unit must now on the one hand evaluate and permit steering in opposite directions so as to enable a maximum target steering angle taking into account the maximum actuation angle. Having regard to the weighting, from the existing target steering angles the arbitration unit prioritizes one target steering angle and then, from it, determines an overall target steering angle that should be set for carrying out the parking process successfully. The arbitration unit carries out that function and the associated calculation of the overall target steering angle continually, at intervals—in the example described, until the parking process has been completed and the vehicle comes to rest. In other words, the arbitration unit continually receives various target steering angles and weights them. During this a continual change of the prioritized target steering angle takes place since this target steering angle information is sent to the steer-by-wire steering system or its control unit and therefore to the arbitration unit from different sources (for example the corridor function and the assistance function for parking).

According to the invention, it is provided that before an actual setting of the overall target angle by the actuator of the steer-by-wire steering system, a check is carried out to see whether the following condition is fulfilled:

The gradient of the overall target steering angle is smaller than or equal to the gradient of the target steering angle.

The method is to be understood as that during the operation of the vehicle or the steer-by-wire steering system it is continuous, i.e. the method or the steps of the method are carried out continually. During this, the checking or further steps can take place at equal or even different time separations, also known as intervals.

The gradient of the overall target steering angle and the target steering angle (time derivative of the angle) yields in each case a steering angle speed.

Despite the most careful selection of components for a steer-by-wire steering system, such as a control unit or the actuator, and despite safety-critical design of the signal path from control units of the vehicle via the bus to the control unit of the steer-by-wire steering system and the most careful programming of the control unit, it is theoretically possible for the calculation of the overall target steering angle to be erroneous. This slight possibility of an erroneous change of the calculated overall target angle should be avoided, so that no hazardous situation can arise. Thus, if the above-mentioned condition is not fulfilled, i.e. the gradient of the overall target angle is larger than the gradient of the target steering angle previously determined by the arbitration unit from the individual steering functions, then as a result an error is recognized. In this error situation it is possible, for example, for the steering movement of the actuator of the steer-by-wire steering system to be temporarily frozen or for the actuator to move the wheels to a wheel steering angle of zero degrees, which corresponds to driving straight ahead. In each case situations which in particular can be controlled safely even by an inexperienced driver are created. In other words, in the event of an error a safer condition of the steer-by-wire steering system is approached. At this point the strict safety grading mentioned earlier for vehicle steering systems in accordance with ASIL should be mentioned again, which makes such checking appropriate or essential. The functions here termed steering functions call for at least one target steering angle even if, for example, a corridor function plays no part directly in the actual steering.

Preferably, the request for a change of the steering angle takes place as a function of a driving situation of the motor vehicle. For example, a corridor function allows a maximum actuation angle at a low speed, such as below or equal to 25 km/h. In that range the corridor function also allows steering in opposite directions. In addition, in that range the assistance function for parking can also be activated. Thus, if the driving situation is taken into account the checking according to the invention can be done even more selectively.

Preferably, before the checking of the gradient of the target steering angle a safety factor is added. The size of the safety factor is chosen variably as a function of the speed of the vehicle and can be filed or stored as one or more characteristic curves in the steer-by-wire steering system or its control unit. Preferably, the size of the safety factor decreases as the speed of the vehicle increases. It is obvious that even small steering movements, of substantially less than one degree, have a much greater effect at a high vehicle speed than at a low vehicle speed, for example in the walking-speed range during the parking process. In other words, the negative effects of a wrongly calculated overall target angle are much more critical at a high speed than at a very low speed. The safety factor is likewise an angular speed, which also takes into account the actuation speed of the actuator of the steer-by-wire steering system.

In a preferred embodiment, the checking is carried out at intervals. Enough results are obtained at intervals of 1 to 20 milliseconds, preferably at an interval of 4 milliseconds. Each check of the gradients is a comparison of the gradients at a fixed time and is thus not an unsolicited check. Accordingly, in that way checks can be carried out selectively and as a function of the driving situation.

In a further preferred embodiment, the arbitration unit additionally superimposes a first target steering angle on at least one further target steering angle, preferably as a function of the driving situation of the motor vehicle. The superimposition takes into account the target steering angle in the calculation of the overall target steering angle, resulting in a gradual change. In that way, sudden changes should be avoided, so that there can be no abrupt steering movements. This could be the case when the difference between the target steering angles of a first and a second steering function, for example automated driving with an assistance system and a driver-imposed steering angle, is so large that without superimposition a large and sudden steering angle change would take place. Obviously, here too the speed of the vehicle as a component of its driving situation plays a part. A gradual change of the wheel steering angle during a parking process can happen more slowly because of the low vehicle speed than, for example, a small wheel steering angle change during an overtaking process in which the driver changes the lane in which the vehicle is driving. A gradual change, however, does not mean that the change from the current steering angle to the target steering angle always has to take place slowly. Advantageously, the gradual change is carried out as a function of parameters such as the speed of the vehicle and the steering function intended in each case. Here too the arbitration unit plays a part as it also does in checking the gradient of the target steering angle. In other words, besides changing the steering angle to be set, the arbitration unit also carries out the superimposition and checks it continually.

To determine the driving situation of the motor vehicle, preferably at least one of the following parameters is read in:
Driving mode
Steering-wheel angle
Steering-wheel angle speed
Steering-wheel angle acceleration
Vehicle speed
Yaw angle speed
Transverse acceleration
Longitudinal acceleration
Wheel steering angle of at least one wheel on an axle to be steered The driving mode parameter takes account of the condition of the vehicle at the time. For example, a manual mode may predominate, in which all the steering inputs are determined by the driver. For example, the driver can activate a driving mode for parking (Parking Assistance System) by means of which a vehicle drives into a parking space automatically or, in other words, autonomously. Such an assistance system can only be activated up to 10 km/h. Likewise, the driver can activate a system for fully automatic driving by means of which the vehicle drives automatically to the extent that it can, or the extent that the driver chooses. When the driver selects a particular driving mode, an interface calls for the change of driving mode. From the vehicle side it is then checked whether the said mode can be selected.

The steering-wheel angle is detected by sensor means at the steering wheel, the steering handle or the steering column of the vehicle. The rotation angle gives information about what the driver wants, i.e. his steering intention. From the steering-wheel angle detected, it is simple to calculate, by differentiating once or twice, the steering angle speed and also the steering angle acceleration. These two parameters enable more detailed conclusions to be drawn about the steering intention, for example a sudden steering movement for avoidance, etc. The yaw angle speed gives information about the rotation rate of the vehicle about its vertical axis. This is detected, for example, by means of a rotation rate sensor in the electronic stability control (ESC) system. For the analysis of the driving situation the parameters transverse acceleration and longitudinal acceleration are also very advantageous. The longitudinal acceleration gives information about the acceleration acting upon the vehicle, for example when braking (negative acceleration) or when accelerating by depressing the accelerator pedal (positive acceleration in the driving direction). Transverse acceleration occurs in a vehicle, for example, when the driving direction is changed or at the start of a curve when driving round the curve. From the latter, parameter conclusions can also be drawn, for example, about lateral forces and lateral guiding forces that are acting upon the chassis or the vehicle. In combination with information about friction values, this can yield conclusions about slip angles or, if relevant, understeering or oversteering.

The axle to be steered is any axle (or axles) which are or will be steered by the steer-by-wire steering system. Before a change of a wheel steering angle it is therefore advantageous to know the current wheel steering angle of the wheel on the axle to be steered. The wheel steering angles of the wheels of a motor vehicle give information, for example, about whether a vehicle is driving straight ahead or round a curve. In other words, the trajectory of the vehicle can be determined from the position of the wheels as gathered from the wheel steering angles.

The list of parameters mentioned is not exclusive. Further parameters, such as determining the condition of the road by means of suitable, in particular optical sensors or cloud-based data or data from a navigation unit, are as conceivable as further parameters not mentioned here, which can be used for determining the driving situation.

Preferably, to determine the driving situation of the motor vehicle, signals from at least one control unit, in particular one that is not part of the steer-by-wire steering system, are read in and taken into account by the arbitration unit. For this, the signals are read in at intervals, in particular in the range of 5 to 40 milliseconds and preferably 10 milliseconds. Thus, a steer-by-wire steering system preferably comprises a control unit of its own. The steering functions mentioned earlier can be implemented, for example, on one or more control units. These control units can relay the target steering angles to the arbitration unit by way of a bus system present in the vehicle, such as the CAN bus or the FlexRay system. The arbitration unit itself can, for example, be implemented in the control unit of the steer-by-wire steering system.

In a preferred embodiment, particularly in the arbitration unit, a debouncing of the values determined from the checking of the gradient comparison is carried out before an actual error in the calculation of the overall target steering angle is concluded. To obtain reliable values and exclude possible mechanical and/or electrical disturbances, the result of the gradient comparison is compared several times. If the error persists over a certain time period, then an error is recognized and the above-mentioned measures are initiated. If the interval for checking the gradient comparison is chosen as 4 ms and, for example, 5 checks are compared with one another for agreement, then the verification of an overall target steering angle that is too large can be obtained in a very short time, namely 20 ms. Thus, the strict safety requirements for steering systems are complied with in the case of a steer-by-wire steering system. Consequently, a further source of error is advantageously eliminated.

Preferably, the at least one steering function is one of the functions mentioned as examples below. The steering functions mentioned are taken from a non-exclusive list. Further similar functions can be used. Preferably these functions are present in a motor vehicle and are carried out in one or more control units, but although they are not carried out in the control unit of the steer-by-wire steering system, they are nevertheless processed by it.
Corridor function
Parking function
Fallback function
Driver assistance function
ESC A first corridor function for low speeds checks, for example, the maximum position angle of the wheels of the vehicle axles. In that way a collision between the wheels and parts of the vehicle body or of the chassis can be prevented when, while driving slowly and when steering in opposite directions is permitted, large wheel steering angle changes are called for. Another corridor function for high speeds can mean limiting the wheel steering angle as a function of the speed of the vehicle to a few minutes, or to smaller changes. In that case, at high speeds the corridor function also checks that, for example, as a function of the driving situation, steering is carried out in the same direction at the front and rear axles in order to increase the driving stability and agility of the vehicle, for example during overtaking processes.

A parking function is an assistance feature that can be selected by the driver so that, for example, after it has been activated, the vehicle is automatically parked in a parking space in the sense of a driver assistance system. This function can interact with the corridor function, for example, at slow speeds.

A fallback function can intervene, for example, in the event of recognized errors, such as missing signals or target specifications (such as angle changes). For example, depending on the speed of the vehicle, such as slower than 50 km/h, ESC signals are expected. If these signals are missing, the fallback function can replace them so that driving can continue within limits. The ESC is the function of the electronic stability program. In this case steering or brake interventions can be carried out on individual wheels in order to keep to the trajectory of the vehicle. This function, for example, is activated at speeds higher than 25 km/h.

A driver assistance function is an umbrella term. At this point driver assistance functions provide for automated driving in the sense of autonomous driving in various stages. The driver can activate the autonomous driving, which at each permitted stage enables partially or fully automated travelling.

The above-mentioned various functions can be active in isolation or at the same time and thus may simultaneously call for changes of the target steering angle which, in themselves, are different. Depending on the driving situation, these are weighted by the arbitration unit and an overall target steering angle is determined after a prioritization process.

According to a further aspect of the invention a control unit is used, which is provided for carrying out a method in accordance with one of the embodiments mentioned earlier. For example, the control unit can be designed in such manner that it works digitally, and the method is carried out in it by means of a computer program with program code means. According to a further aspect, the invention relates to a computer program with program code means for carrying out the method in accordance with one of the embodiments mentioned earlier when the program is stored in a computer and run, in particular, on the aforesaid control unit.

Finally, the invention relates to a steer-by-wire steering system with a control unit as mentioned above. In a preferred embodiment, the steer-by-wire steering system is a rear-axle steering system of a motor vehicle. Thus, in a vehicle a mechanically or electrically assisted mechanical steering system can be present on the front axle, which system receives steering signals from the driver by way of a steering device such as a steering wheel. In this case the rear-axle steering would be an additional steering system mechanically decoupled from the front-axle steering, which in the case of oppositely directed steering offers a distinct advantage in the form of a smaller turning circle and much improved parking possibilities. To increase the agility and driving safety by enhancing the driving stability by virtue of steering in the same direction at high speeds, for example above 50 km/h, the rear-axle steering can be used to good advantage. However, it is not excluded that all the axles of a vehicle are fitted with steer-by-wire steering systems operated by actuation signals from a control unit. By virtue of the mechanical component that is not then required (steering column for the front axle steering gear assembly) weight and cost can be advantageously reduced.

BRIEF DESCRIPTION OF THE DRAWINGS

Below, the invention is described with reference to preferred embodiments relating to the drawing, which shows.

DETAILED DESCRIPTION

Figure 1:
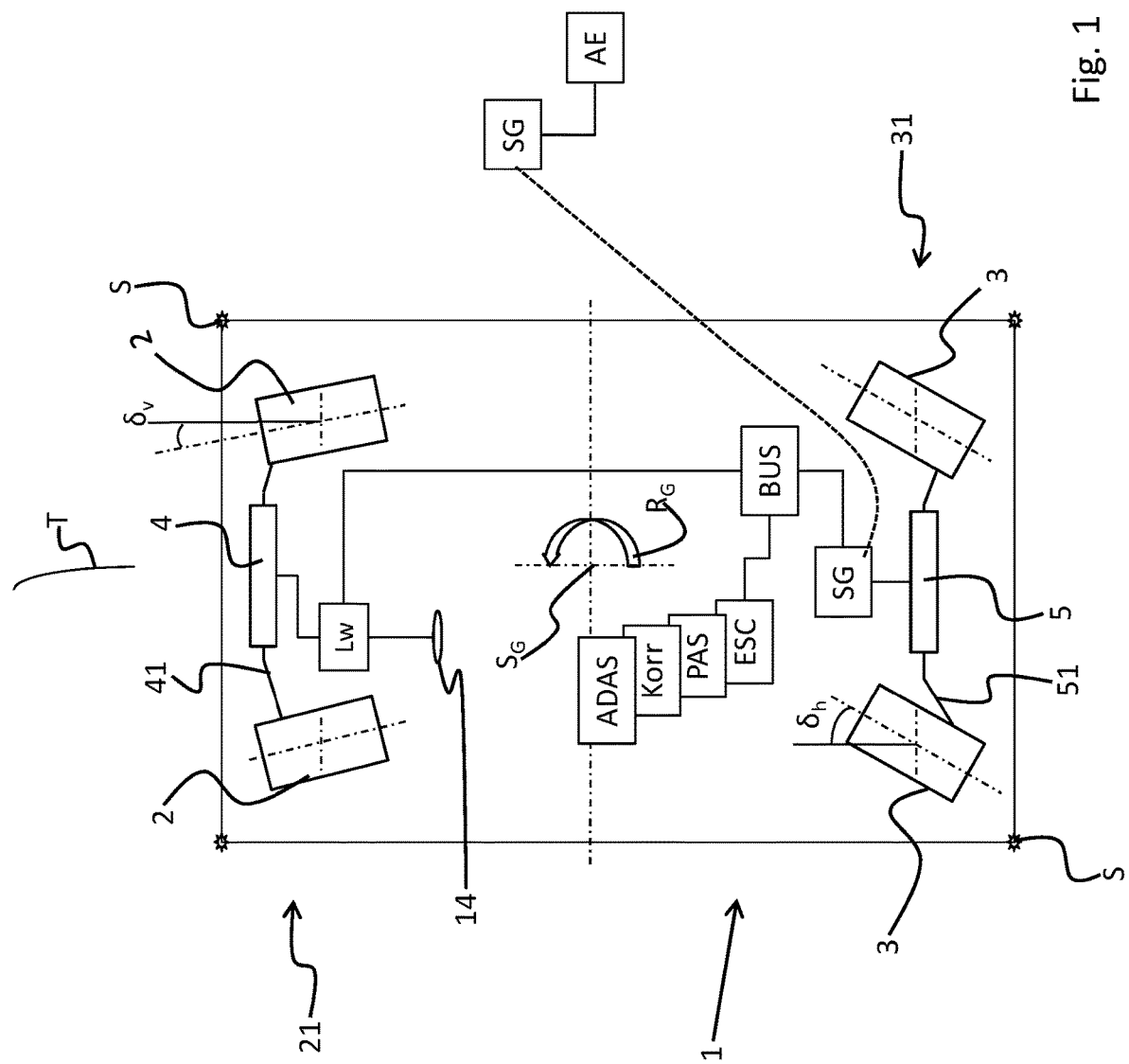
FIG. 1: A vehicle with a steer-by-wire steering system

FIG. 1 shows schematically a vehicle 1 with a steerable front axle 21 and a steerable rear axle 31. For steering the wheels 2 on the front axle 21 a steering system 4 is provided, which can set or change the wheel steering angle δ, at the wheels 2 by means of a steering rod 41. In this example the said angle δ, is indicated for the right-hand wheel 2 in FIG. 1. At the rear axle 31 a steer-by-wire steering system 5 provides for the setting or changing of the wheel steering angle $δ_h$ of the rear wheels 3 by means of a steering rod 51. In the embodiment shown, the wheels controlled by the front axle steering system 4 and the wheels controlled by the rear axle steering system 5 are steered in opposite directions so that at low speeds, for example of less than 50 km/h, the turning circle is smaller and the parking possibilities are better compared with vehicles which have only one steered axle. Moreover, with two steered axles automated journeys can advantageously be carried out in a better way. The steering angle at the front axle is set by the driver, in this case basically by means of a steering wheel 14, the steering angle Lw being detected by a sensor unit, and the steering angle being relayed via a signal line to the steer-by-wire steering system 4, which sets it. The sensor unit for transmitting the steering angle Lw is connected electrically to the control unit of the steer-by-wire steering system 5 by way of a bus system. The bus system is for example a CAN bus or a FlexRay bus. Via the bus system steering functions for a driver assistance system ADAS for autonomous driving, correction functions Korr for limiting the maximum steering angle, a parking assistance function PAS for automated parking and an electronic stability control ESC are connected electrically to the control unit SG of the steer-by-wire steering system of the rear axle. This control unit SG is provided with an arbitration unit AE which continually checks the gradients of the target steering angles dSLw_i/dt against the gradient dG_SLw/dt of the overall target steering angle G_SLw determined by the arbitration unit. In FIG. 1, to that end the control unit SG is shown spaced apart along the broken line, in order to indicate that the arbitration unit AE is part of the control unit SG or the rear steer-by-wire steering system 5.

A yaw rate $R_G$ measured at the center of gravity $S_G$ is determined by a suitable sensor (rotation rate sensor) at the center of gravity of the vehicle 1 and received and evaluated by the electronic stability control ESC. At the outer corners of the vehicle 1 sensors S are arranged, which are associated with a sensor system and serve to recognize the surroundings of the vehicle. These can be temperature sensors, optical sensors that may for example include a camera, or even a LiDAR or radar, which are suitable for temperature, distance or even visual observation of the road, for example. Thus, weather conditions such as humidity or the temperature on the road, etc., can be determined and sent to the control unit SG. The vehicle follows a trajectory T, which in the figure is likewise represented schematically at the front end of the vehicle in its travel direction.

Figure 2:
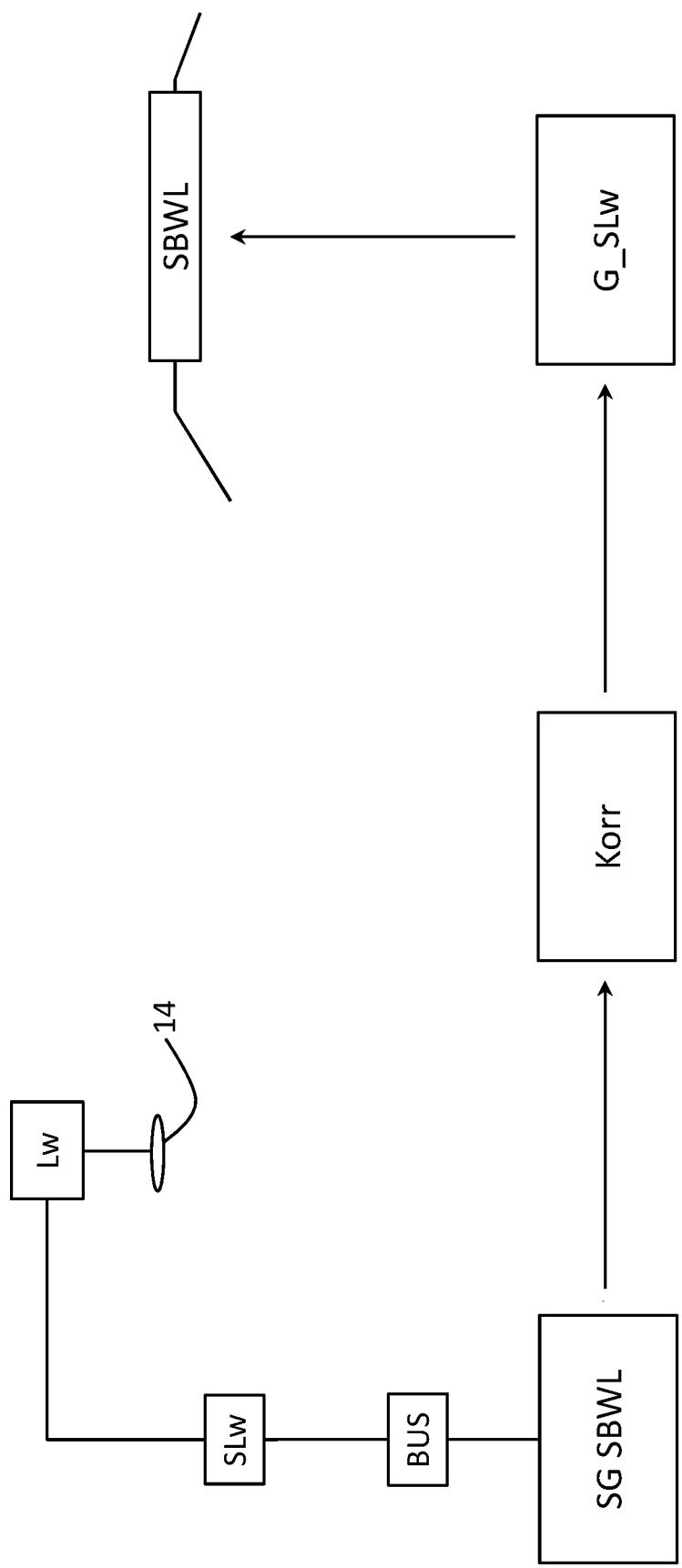
FIG. 2: A flow chart of a method according to the prior art

FIG. 2 shows the signal path from the steering device or steering wheel 14 until the actual change of the steering angle or the setting of the overall target steering angle G_SLw by the steer-by-wire steering system STEER-BY-WIRE system according to the prior art. Following the steering movement by the driver at the steering wheel 14, a steering angle Lw is detected by the sensor unit. Along the signal path the target steering angle SLw is relayed via a vehicle bus system such as the CAN bus to a control unit SG SBWL of the steer-by-wire system. The control unit SG SBWL of the steer-by-wire system takes into account the corridor function Korr running in it so that a maximum steering angle is not exceeded. Thus, among other things the steered wheel is prevented from colliding with parts of the chassis or the vehicle body. The control unit SG SBWL then determines the overall target steering angle G_SLw and sends it to the steer-by-wire steering system SBWL which, by means of the actuator built into it, carries out the change of the wheel steering angle. The arrangement described and the method that can be carried out with it does not enable other steering functions to be incorporated.

Figure 3:
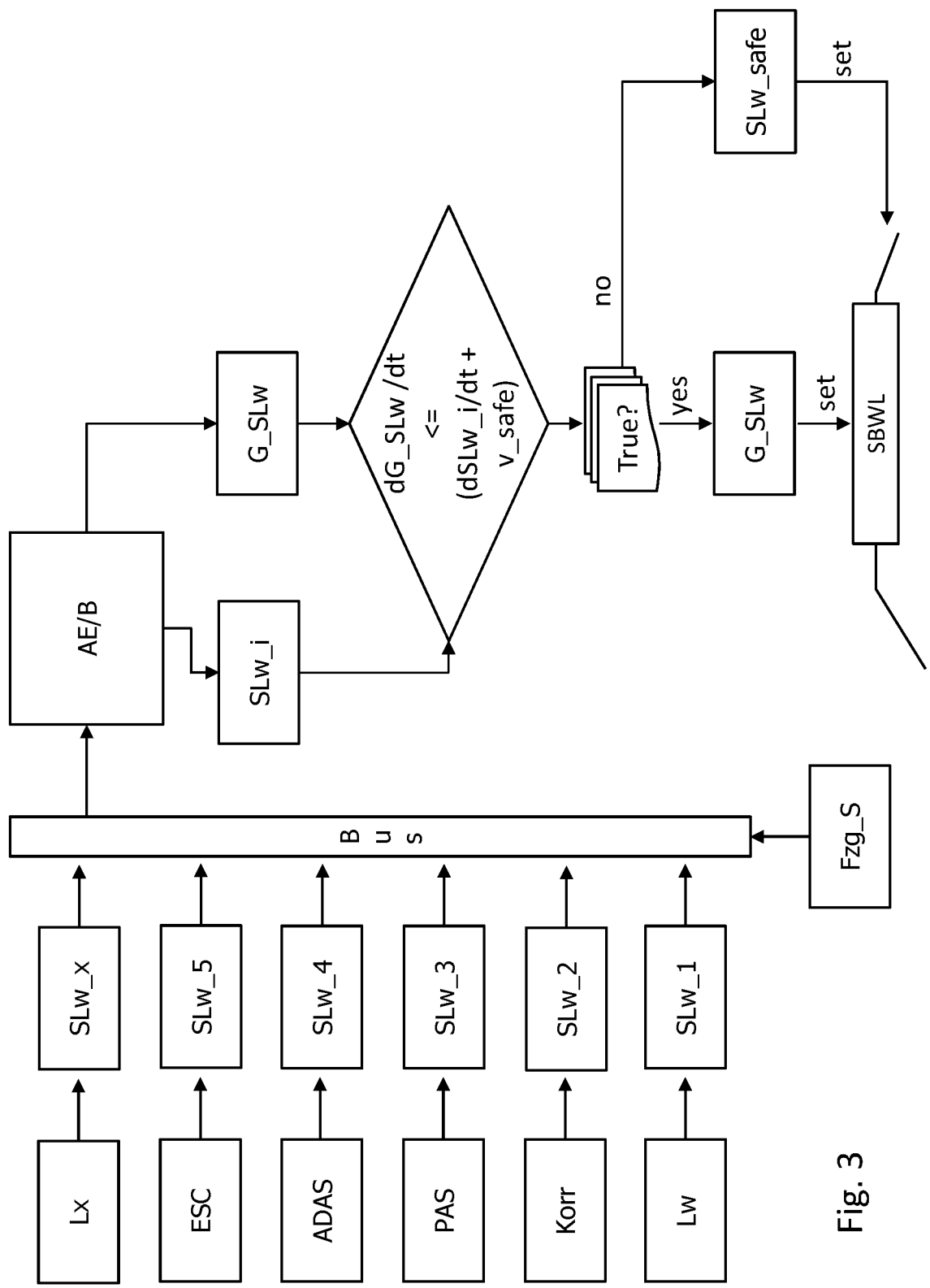
FIG. 3: A flow chart of a method according to the invention

FIG. 3 shows a schematic flow chart of an arrangement and method according to the invention. Shown approximately in the middle is a bus system in the vehicle, which can be a CAN bus or a FlexRay bus or similar bus for the relaying of signals. To the left of the bus various steering functions are indicated. The functions driver steering angle Lw, corridor function Korr, parking assistance PAS, driver assistance system for autonomous driving ADAS and the electronic stability control ESC, already described earlier in connection with FIG. 1, each request a target steering angle SLw_1 to SLw_5 when necessary and these are sent to the bus. For example, the further steering function Lx is indicated, which requests a target steering angle SLw_x and stands for further steering functions not mentioned here and the target steering angles requested by them. The designation Fzg_S indicates that the driving situation is also sent to the bus as a signal and can be read in from it by the arbitration unit AE. All the target steering angles SLw_1 to SLw_5 are read in as separate signals by the arbitration unit AE, which contains a superimposition function B. The arbitration unit AE weights the individual target steering angles (SLw_1 to SLw_x) and prioritizes a target steering angle SLw_i. In other words, the arbitration unit decides in favor of a source that corresponds to one of the aforesaid steering functions. It is also possible that, at least temporarily, the information from two sources is mixed with one another. Ultimately, however, taking into account the current driving situation Fzg_S, the arbitration unit AE determines a target steering angle SLw_i and from it determines an overall target steering angle G_SLw, which is calculated continually.

To avoid sudden steering movements, by means of the superimposition function associated with it the arbitration unit can change gradually from a first determined target steering angle to a target steering angle determined subsequently. This also takes place continually.

In a further step, a check is carried out continually at intervals of 4 ms to see whether the gradient of the overall target steering angle G_SLw in question is smaller than or equal to the gradient of the target steering angle SLw_i determined, plus a safety factor v_safe added in each case. The result of the said checking is stored in each case and by comparison with the next-calculated value it is checked whether the same result occurs repeatedly. For example, if the condition occurs five times in succession (True?=yes), then at the steer-by-wire steering system the overall target steering angle G_SLw is set. The actuator of the steer-by-wire steering system then sets this overall target steering angle G_SLw. If the check shows repeatedly, for example five times in succession within 20 ms, that the condition is not fulfilled (True?=no), then the steer-by-wire steering system is set to an error mode or safety mode SLw_safe. In that case, depending on the driving situation the steer-by-wire steering system freezes the current steering angle or, depending on the driving situation, gradually approaches a steering angle of 0° which corresponds to driving straight ahead. This ensures that if an error occurs in the calculation of the overall target steering angle G_SLw, no situation that cannot be controlled by a normal driver will occur. Thus, a steer-by-wire steering system or a method for operating a steer-by-wire steering system is advantageously obtained, which satisfies the strict safety requirements specified by ASIL.

INDEXES 1 vehicle
2 Front wheel
3 Rear wheel
4 Front axle steering
5 Rear axle steering
14 Steering wheel
21 Front axle
31 Rear axle
41 Steering rod
51 Steering rod
AE Arbitration unit
ADAS Driver assistance system for autonomous driving
B Superimposition function
BUS Bus system (CAN, Flexray)
ESC Electronic stability control
Korr Corridor function
PAS Parking assistance function
$R_G$ Yaw rate
SG Control unit
$S_G$ Center of gravity
S Sensor system
T Trajectory
$\delta_v$ Wheel steering angle, front
$\delta_h$ Wheel steering angle, rear
Fzg_S Driving situation
Lw Steering angle set by driver
Lx Further steering function
SLw(_1 to _5) Target steering angle
SLw_x Further target steering angle
SLw_i Target steering angle (determined by AE)
SG SBWL Control unit of the steer-by-wire steering system
G_SLw Overall target steering angle
SBWL Steer-by-wire steering system
dG_SLw/dt Gradient of the overall target steering angle
dSLw_i/dt Gradient of the target steering angle
SLw_safe Safety mode of the steer-by-wire steering system
v_safe Safety factor

The invention claimed is:
1. A method for operating a steer-by-wire steering system of a motor vehicle having at least one steering function, an arbitration unit, and an actuator, the method comprising:
requesting, by the at least one steering function of the steer-by-wire steering system, one or more steering angle changes for at least one vehicle axle;

weighting, by the arbitration unit (AE), the one or more steering angle changes as target steering angles (SLw_i);

determining a selected target steering angle (G_SLw), taking into account at least one of the target steering angles (SLw_i);

determining that a gradient of the selected target steering angle (G_SLw) is smaller than or equal to a gradient of the at least one of the target steering angles (SLw_i) taken into account; and setting, by the actuator of the steer-by-wire steering system, the selected target steering angle (G_SLw) for the at least one vehicle axle.

2. The method according to claim 1, wherein requesting the one or more steering angle changes is performed as a function of a driving situation (Fzg_S) of the motor vehicle.

3. The method according to claim 2, further comprising determining the driving situation (Fzg_S) of the motor vehicle using at least one parameter selected from: a driving mode, a steering wheel position, a steering wheel angle speed, a steering-wheel angle acceleration, a speed of the vehicle, a yaw angle speed, a transverse acceleration, a longitudinal acceleration, and a wheel steering angle of at least one wheel on an axle to be steered.

4. The method according to claim 3, wherein determining the driving situation (Fzg_S) of the motor vehicle includes the arbitration unit taking into account signals from at least one control unit that is distinct from the steer-by-wire steering system, the signals being read in at an interval from 5 to 40 ms.

5. The method according to claim 4, wherein the interval is 10 ms.

6. The method according to claim 1, further comprising determining a safety factor (v_safe) as a function of a speed of the vehicle, wherein determining the safety factor (v_safe) is performed prior to determining that the gradient of the overall target steering angle (G_SLw) is smaller than or equal to the gradient of the at least one of the target steering angles (SLw_i).

7. The method according to claim 6, wherein the safety factor (v_safe) decreases as the speed of the vehicle increases.

8. The method according to claim 6, further comprising debouncing a result of the checking in order to determine whether G_SLw≤SLw_i or G_SLw≤SLw_i+v_safe.

9. The method according to claim 1, wherein determining that the gradient of the selected target steering angle (G_SLw) is smaller than or equal to the gradient of the at least one of the target steering angles (SLw_i) taken into account is performed on a continuous basis.

10. The method according to claim 1, wherein determining that the gradient of the selected target steering angle (G_SLw) is smaller than or equal to the gradient of the at least one of the target steering angles (SLw_i) taken into account is performed periodically at an interval from 1 to 20 ms.

11. The method according to claim 10, wherein the interval is 4 ms.

12. The method according to claim 1, wherein when determining the overall target steering angle (G_SLw), the arbitration unit (AE) carries out a superimposition (B), having regard to a first target steering angle (S_Lw1) and at least one further target steering angle (S_Lw2).

13. The method according to claim 12, wherein the superimposition (B) is a function of a driving situation (Fzg_S) of the motor vehicle.

14. The method according to claim 1, further comprising providing a control unit configured with the at least one steering function, the control unit distinct from the control unit of the steer-by-wire steering system and wherein the at least one steering function is selected from a corridor function, a parking function, a fallback function, and a driver assistance function.

15. A non-transitory computer-readable storage medium containing machine-readable code that is configured to perform the method of claim 1 when executed by the steer-by-wire steering system of the motor vehicle.

16. A steer-by-wire steering system for a motor vehicle, comprising:
  a control unit with at least one steering function;
  an arbitration unit; and
  an actuator;
  wherein the steer-by-wire steering system is configured to carry out the following method:
    requesting, by the at least one steering function, one or more steering angle changes for at least one vehicle axle;
    weighting, by the arbitration unit (AE), the one or more steering angle changes as target steering angles (SLw_i);
    determining a selected target steering angle (G_SLw), taking into account at least one of the target steering angles (SLw_i);
    determining that a gradient of the selected target steering angle (G_SLw) is smaller than or equal to a gradient of the at least one of the target steering angles (SLw_i) taken into account; and
    setting, by the actuator of the steer-by-wire steering system, the selected target steering angle (G_SLw) for the at least one vehicle axle.

17. The steer-by-wire steering system according to claim 16, wherein the steer-by-wire steering system is configured as a rear-axle steering system of the motor vehicle.

* * * * *